(12) United States Patent
Dai et al.

(10) Patent No.: US 10,215,617 B2
(45) Date of Patent: Feb. 26, 2019

(54) ANALOG SENSOR WITH DIGITAL COMPENSATION FUNCTION

(71) Applicants: Mettler Toledo (Changzhou) Precision Instrument Ltd., Changzhou (CN); Mettler Toledo (Changzhou) Measurement Technology Ltd., Changzhou (CN); Mettler Toledo (Changzhou) Scale & System Ltd., Changzhou (CN)

(72) Inventors: Feng Dai, Changzhou (CN); Daniel Reber, Changzhou (CN); Jean-Christophe Emery, Changzhou (CN)

(73) Assignees: METTER TOLEDO (CHANGZHOU) PRECISION INSTRUMENT LTD., Changzhou, Jiangsu (CN); METTER TOLEDO (CHANGZHOU) MEASUREMENT TECHNOLOGY LTD., Changzhou, Jiangsu (CN); METTER TOLEDO (CHANGZHOU) SCALE & SYSTEM LTD., Changzhou, Jiangsu (CN)

( * ) Notice: Subject to any disclaimer, the term of this patent is extended or adjusted under 35 U.S.C. 154(b) by 367 days.

(21) Appl. No.: 15/134,087

(22) Filed: Apr. 20, 2016

(65) Prior Publication Data
US 2016/0231182 A1 Aug. 11, 2016

Related U.S. Application Data

(63) Continuation of application No. PCT/CN2014/089984, filed on Oct. 31, 2014.

(30) Foreign Application Priority Data

Nov. 1, 2013 (CN) ............................ 2013 1 0538774
Nov. 1, 2013 (CN) ...................... 2013 2 0685865 U (51) Int. Cl.
*G01G 3/18* (2006.01)
*G01G 3/14* (2006.01)
(Continued)

(52) U.S. Cl.
CPC ............. *G01G 3/18* (2013.01); *G01G 3/1414* (2013.01); *G01L 1/2268* (2013.01);
(Continued)

(58) Field of Classification Search
CPC ...... G01G 3/18; G01G 3/1414; G01G 3/1402; G01G 3/141; G01L 1/2281; G01L 1/20;
(Continued)

(56) References Cited

U.S. PATENT DOCUMENTS 3,213,400 A * 10/1965 Gieb ..................... G01L 1/2218
338/4
3,289,134 A * 11/1966 Laimins ................ G01L 9/0051
338/4
(Continued)

FOREIGN PATENT DOCUMENTS

CN 87102892 A 12/1987
CN 2601395 Y 1/2004
(Continued)

OTHER PUBLICATIONS

International Search Report (PCT/ISA/210) dated Feb. 4, 2015, by the Chinese Patent Office as the International Searching Authority for International Application No. PCT/CN2014/089984.
(Continued)

*Primary Examiner* — Randy Gibson
(74) *Attorney, Agent, or Firm* — Buchanan Ingersoll & Rooney PC (57) ABSTRACT

An analog sensor with digital compensation function includes a deformation part generating a deformation relating to a pressure sensed by the analog sensor; a strain gauge
(Continued)

connected to the deformation part and generating a change in resistance relating to the deformation; a strain gauge bridge connected to the strain gauge and transferring the change in the resistance of the at least one strain gauge to output a first analog signal; and an analog-to-digital conversion module converting the first analog signal to a first digital signal, representative of weight. A signal processing and output circuit compensates the first digital signal and converts it into a second analog signal.

16 Claims, 9 Drawing Sheets

(51) Int. Cl.
G01L 1/22 (2006.01)
G01L 19/04 (2006.01)
G01L 9/04 (2006.01)
G06J 1/00 (2006.01)
G01L 19/00 (2006.01)
G01L 9/00 (2006.01)

(52) U.S. Cl.
CPC ........ *G01L 1/2281* (2013.01); *G01L 19/0092* (2013.01); *G06J 1/00* (2013.01); *G01G 3/1402* (2013.01); *G01L 9/0002* (2013.01)

(58) Field of Classification Search
CPC . G01L 9/0002; G01L 19/0092; G01L 1/2231; G01L 9/0055; G01L 1/2268; G06J 1/00
See application file for complete search history.

(56) References Cited

U.S. PATENT DOCUMENTS

| 4,355,692 | A | * | 10/1982 | Ostrelich | G01L 1/20 177/211 |
| 4,454,771 | A | * | 6/1984 | Shimazoe | G01L 1/18 73/777 |
| 4,468,968 | A | * | 9/1984 | Kee | G01D 3/022 702/138 |
| 4,592,002 | A | | 5/1986 | Bozarth, Jr. et al. | |
| 4,798,093 | A | * | 1/1989 | Kenoun | G01L 1/2281 73/708 |
| 4,858,145 | A | | 8/1989 | Inoue et al. | |
| 4,966,039 | A | * | 10/1990 | Dell'Acqua | G01L 9/0055 338/4 |
| 5,024,107 | A | * | 6/1991 | Bethe | G01L 1/2231 338/4 |
| 5,801,339 | A | * | 9/1998 | Boult | G01G 17/08 177/261 |
| 6,507,202 | B1 | * | 1/2003 | Sasanouchi | G01L 1/2256 324/727 |
| 7,194,922 | B2 | | 3/2007 | Bucher et al. | |
| 2005/0081650 | A1 | | 4/2005 | Bucher et al. | |

FOREIGN PATENT DOCUMENTS

| CN | 1643349 A | 7/2005 |
| CN | 102353481 A | 2/2012 |
| CN | 102645293 A | 8/2012 |
| CN | 202522348 U | 11/2012 |
| CN | 203231800 U | 10/2013 |
| CN | 203551059 U | 4/2014 |
| EP | 0147700 A2 | 7/1985 |
| EP | 0971216 A2 | 1/2000 |
| GB | 1495278 A | 12/1977 |
| GB | 2 113 849 A | 8/1983 |
| JP | 11311564 A | 11/1999 |

OTHER PUBLICATIONS

The extended European Search Report dated Jun. 23, 2017, by the European Patent Office in corresponding European Patent Application No. 14858032.7-1557. (7 pages).

Qiu et al., "Digital Pressure Sensor Compensation Based on USB Interface," Instrument Technique and Sensor, (Oct. 31, 2009), ISSN: ISSN 1002-1841, pp. 264-266, 276.

* cited by examiner

ANALOG SENSOR WITH DIGITAL COMPENSATION FUNCTION

RELATED APPLICATIONS

This application claims priority as a continuation application under 35 U.S.C. § 120 to PCT/CN2014/089984, which was filed as an International Application on Oct. 31, 2014 designating the U.S., and which claims priority to Chinese Application 201320685865.7 filed in China on Nov. 1, 2013 and to Chinese Application 201310538774.5 filed in China on Nov. 1, 2013. The entire contents of these applications are hereby incorporated by reference in their entireties.

FIELD

The present disclosure relates to the field of analog sensors, and to analog weighing sensors with digital compensation function.

Strain-gauge type analog sensors are commonly used as analog weighing sensors. Since almost all measuring instruments support analog sensors, strain-gauge type analog weighing sensors have advantages such as simple interfaces, being able to be applied directly to dynamic weighing situations, etc. Traditional strain-gauge type analog sensors compensate zero-point, sensitivity and temperature coefficients by connecting resistors on the strain gauge bridge in series or in parallel, and may implement linear compensation only once with poor compensation accuracy. Further, the approach of analog compensation cannot address errors such as creep and delay that are related to time and loading capacity.

In light of this, a known weighing sensor receives analog signals from a strain gauge bridge of the sensor, digitalizes the analog signals, calculating the collected weight signals and temperature signals (if any) with a series of models to derive the compensated weight data, and finally outputs the compensated weight data to a measuring instrument or other peripherals via a specific digital port (e.g., RS232/485, CANOPEN, etc.).

However, with this kind of weighing sensor, the interfaces of the analog weighing sensor become complicated since the specific digital port is required to output the compensated weight data, and this limits the general connectivity of the measuring instrument or other peripherals.

SUMMARY

An analog sensor, is disclosed comprising: a deformation part for generating a deformation relating to a force applied to the analog sensor; at least one strain gauge connected to the deformation part for generating a change in electrical resistance relating to the deformation; at least one strain gauge bridge in connection with the at least one strain gauge for transferring a change in the electrical resistance of the at least one strain gauge to output a first analog signal; an analog-to-digital conversion module connected to an output of the at least one strain gauge bridge, receiving the first analog signal from the at least one strain gauge bridge and converting the first analog signal to a first digital signal, where the first analog signal is an analog signal representative of the force; an analog output port for outputting a second analog signal; and a signal processing and output circuit, the signal processing and output circuit being connected between an output of the analog-to-digital conversion module and the analog output port, for compensating the first digital signal and converting the first digital signal into the second analog signal.

BRIEF DESCRIPTION OF THE DRAWINGS

Accompany drawings are included to provide a further understanding of embodiments encompassed by the present disclosure, and constitute a part of the present application. Exemplary embodiments of the present invention are illustrated in accompanying drawings and are used to explain principles of the present invention together with this description. In the drawings.

DETAILED DESCRIPTION

An analog sensor, such as an analog weighing sensor is disclosed, with a digital compensation function that may achieve high-accuracy compensation while keeping the interfaces of the analog weighing sensor simple.

According to an aspect of the present disclosure, an analog sensor is provided. The analog sensor includes a deformation part generating a deformation according to a force sensed by the analog sensor, at least one strain gauge connected to the deformation part and generating a change in the resistance according to the deformation, at least one strain gauge bridge connected to the at least one strain gauge and transferring the change in the resistance of the at least one strain gauge to output a first analog signal, an analog-to-digital conversion module connected to an output of the at least one strain gauge bridge, receiving the first analog signal from the at least one strain gauge bridge and converting the first analog signal to a first digital signal, where the first analog signal is an analog signal representative of the force. The analog sensor can include an analog output port for outputting a second analog signal, and a signal processing and output circuit, the signal processing and output circuit being connected between the output of the analog-to-digital conversion module and the analog output port, compensating the first digital signal and converting the first digital signal into the second analog signal.

According to another aspect of the present disclosure, the signal processing and output circuit includes a compensation module connected to the output of the analog-to-digital conversion module and compensating the first digital signal to generate a compensated first digital signal, and a digital-to-analog conversion module connected to the output of the compensation module, receiving the compensated first digital signal and converting the compensated first digital signal into the second analog signal.

According to another aspect of the present disclosure, the signal processing and output circuit include a compensation module connected to the output of the analog-to-digital conversion module and compensating the first digital signal to generate a second digital signal representative of an amount of analog signal to be compensated, a digital-to-analog conversion module connected to the output of the compensation module, receiving the second digital signal and converting it into a third analog signal, and an operational amplification circuit connected to the output of the strain gauge bridge and the output of the digital-to-analog conversion module of the analog sensor, receiving the first analog signal and the third analog signal, and adding the first analog signal and the third analog signal to generate the second analog signal.

According to another aspect of the present disclosure, the signal processing and output circuit includes a compensation module connected to the output of the analog-to-digital conversion module and compensating the first digital signal to generate an amount of analog signal to be compensated, a pulse width modulation module connected to the output of the compensation module and pulse modulating the amount of analog signal to be compensated with a square wave to generate a fourth analog signal, and an add circuit connected to the output of the strain gauge bridge and the output of the pulse width modulation module of the analog sensor, receiving the first analog signal and the fourth analog signal, and adding the first analog signal and the fourth analog signal to generate the second analog signal.

According to another aspect of the present disclosure, the analog sensor includes a temperature sensor, an output of the temperature sensor being connected to an input of the analog-to-digital conversion module, the temperature sensor collecting analog signals representative of the temperature and output them into an input of the analog-to-digital conversion module, wherein the analog signals representative of the temperature and the first analog signal being converted together into the first digital signal.

According to another aspect of the present disclosure, the analog sensor includes a diagnosis module, the diagnosis module being connected between an output of the analog-to-digital conversion module and an input of the signal processing and output circuit, analysing the first analog signal to generate diagnosis status data representative of an operational status of the analog sensor, and transferring the diagnosis status data to the signal processing and output circuit.

According to another aspect of the present disclosure, the analog sensor includes: a temperature sensor, an output of the temperature sensor being connected to an input of the analog-to-digital conversion module, the temperature sensor collecting analog signals representative of the temperature and outputting them into an input of the analog-to-digital conversion module, wherein the analog signals representative of the temperature and the first analog signal being converted together into the first digital signal; and a diagnosis module, the diagnosis module being connected between an output of the analog-to-digital conversion module and an input of the signal processing and output circuit, analysing the first analog signal to generate diagnosis status data representative of an operational status of the analog sensor, and transferring the diagnosis status data to the signal processing and output circuit.

According to another aspect of the present disclosure, the analog sensor includes a digital output port, the signal processing and output circuit further including a transmission module, the transmission module being connected between the output of the diagnosis module and the digital output port for transferring the diagnosis status data.

According to another aspect of the present disclosure, the analog sensor includes a digital output port, the signal processing and output circuit including a transmission module, the transmission module being connected between the output of the diagnosis module and the digital output port for transferring the diagnosis status data.

According to an aspect of the present disclosure, the analog sensor is an analog weighing sensor. The analog weighing sensor includes a deformation part generating a deformation according to a load sensed by the analog sensor, at least one strain gauge connected to the deformation part and generating a change in the resistance according to the deformation, at least one strain gauge bridge in connection with the at least one strain gauge and transferring the change in the resistance of the at least one strain gauge to output a first analog signal, an analog-to-digital conversion module connected to an output of the at least one strain gauge bridge, receiving the first analog signal from the at least one strain gauge bridge and converting the first analog signal to a first digital signal, where the first analog signal is an analog signal representative of the load. The analog sensor further comprises an analog output port for outputting a second analog signal, and a signal processing and output circuit, the signal processing and output circuit being connected between the output of the analog-to-digital conversion module and the analog output port, compensating the first digital signal and converting the first digital signal into the second analog signal.

Exemplary embodiments of the present invention will now be described in detail in connection with the accompanying drawings.

Figure 1:
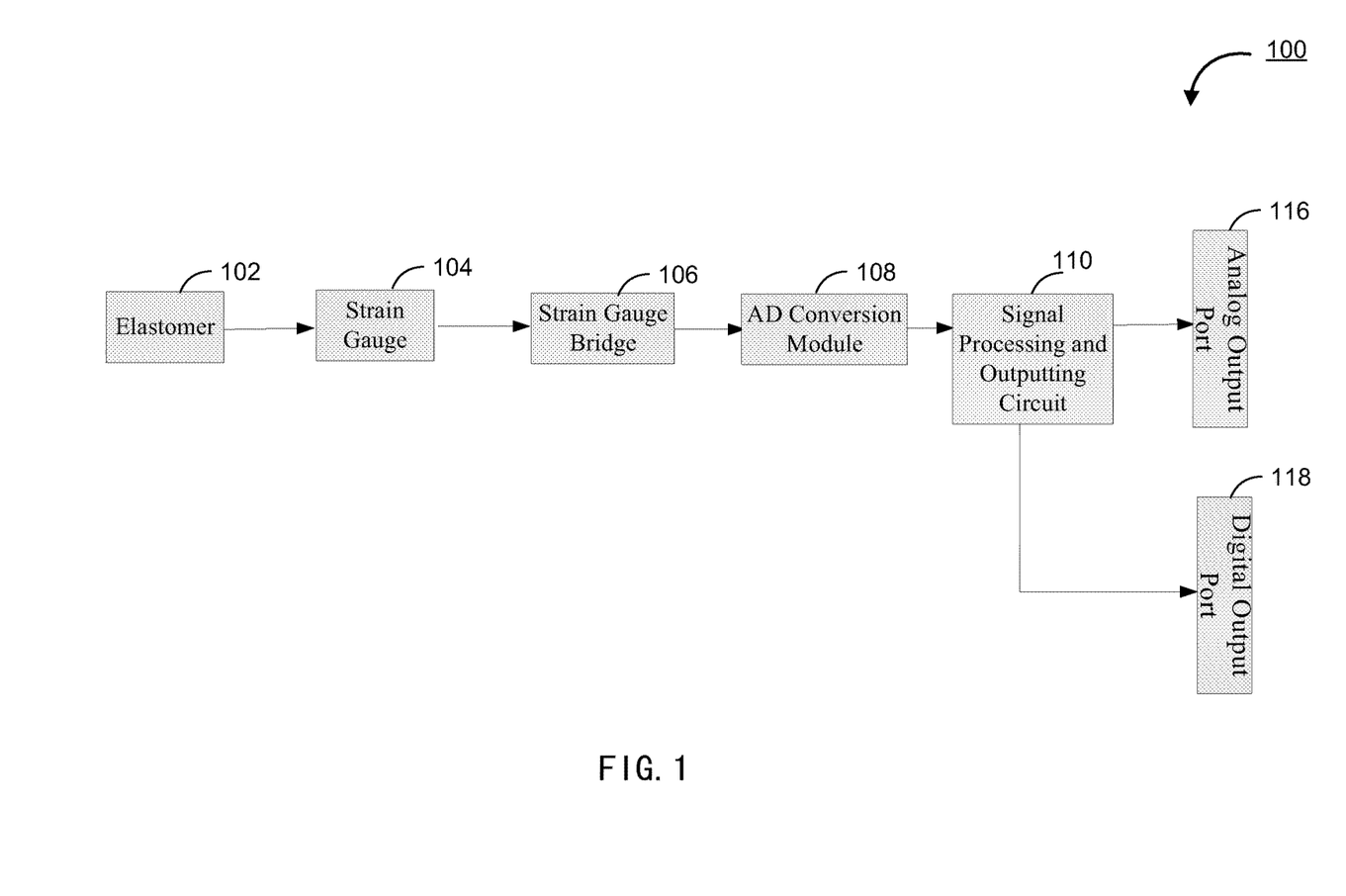
FIG. 1 is a schematic diagram of an analog sensor according to an exemplary embodiment of the present disclosure.

FIG. 1 is a schematic diagram of an analog sensor according to an exemplary embodiment. As shown in FIG. 1, the analog sensor 100 comprises a deformation part 102 generating a deformation according to a pressure sensed by the analog sensor, a strain gauge 104 connected to the deformation part and generating a change to the resistance according to the deformation, a strain gauge bridge 106 connected to the strain gauge and transferring the change to the resistance to output a first analog signal, an analog-to-digital conversion module 108 connected to an output of the strain gauge bridge, receiving the first analog signal from the strain gauge bridge and converting the first analog signal to a first digital signal, where the first analog signal is an analog signal representative of weight. The analog sensor 100 includes a signal processing and output circuit 110, the signal processing and output circuit 110 being connected between the output of the analog-to-digital conversion module 108 and the analog output port 116, compensating the first digital signal and converting it into a second analog signal, and an analog output port 116 for outputting the second analog signal.

The analog sensor 100 shown in FIG. 1 further includes a digital output port 118, through which the output of the signal processing and output circuit 110 also outputs. In an embodiment, the digital output port 118 may output digital weighing information according to the user's requirements.

Figure 2:
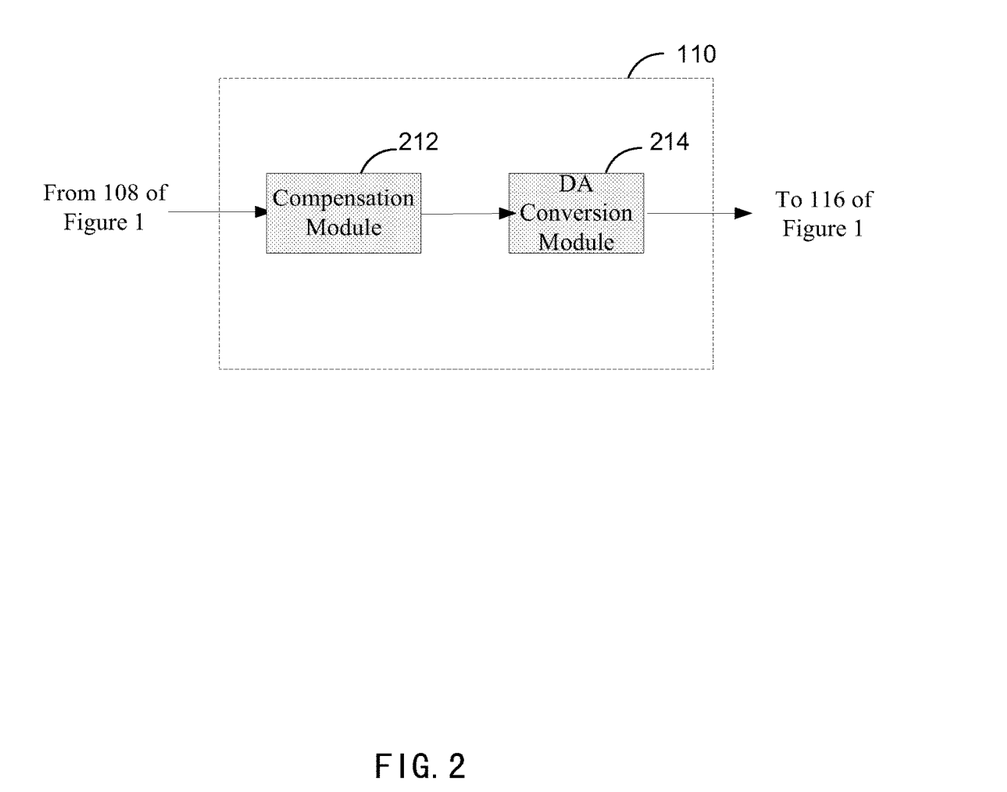
FIG. 2 is a schematic diagram of a signal processing and output circuit of an analog sensor according to an exemplary embodiment of the present disclosure.

FIG. 2 is a schematic diagram of a signal processing and output circuit of an analog sensor according to an exemplary embodiment of the present disclosure. The signal processing and output circuit 110 includes a compensation module 212 connected to the output of the analog-to-digital conversion module 108 (See FIG. 1) and compensating the first digital signal to generate a compensated first digital signal, and a digital-to-analog conversion module 214 connected to the output of the compensation module 212, receiving the compensated first digital signal and converting it into the second analog signal. The second analog signal is further outputted through an analog output port 116 (See FIG. 1).

Figure 3:
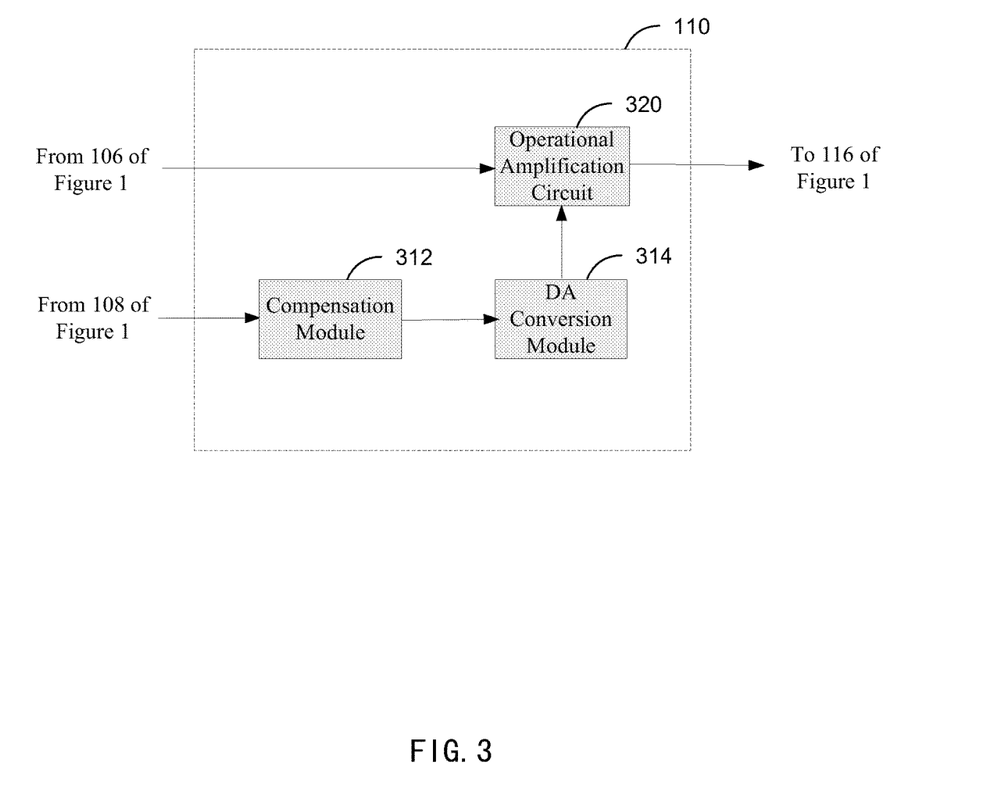
FIG. 3 is a schematic diagram of a signal processing and output circuit of an analog sensor according to another exemplary embodiment of the present disclosure.

FIG. 3 is a schematic diagram of a signal processing and output circuit of an analog sensor according to another embodiment of the present invention. The signal processing and output circuit 110 includes a compensation module 312 connected to the output of the analog-to-digital conversion module 108 and compensating the first digital signal to generate a second digital signal representative of an amount of analog signal to be compensated, a digital-to-analog conversion module 314 connected to the output of the compensation module 312, receiving the second digital signal and converting it into a third analog signal, and an operational amplification circuit 320 connected to the output of the strain gauge bridge 106 and the output of the digital-to-analog conversion module 314 of the analog sensor, receiving the first analog signal and the third analog signal, and adding the first analog signal and the third analog signal to generate the second analog signal. The second analog signal is further outputted through an analog output port 116 (See FIG. 1).

Figure 4:
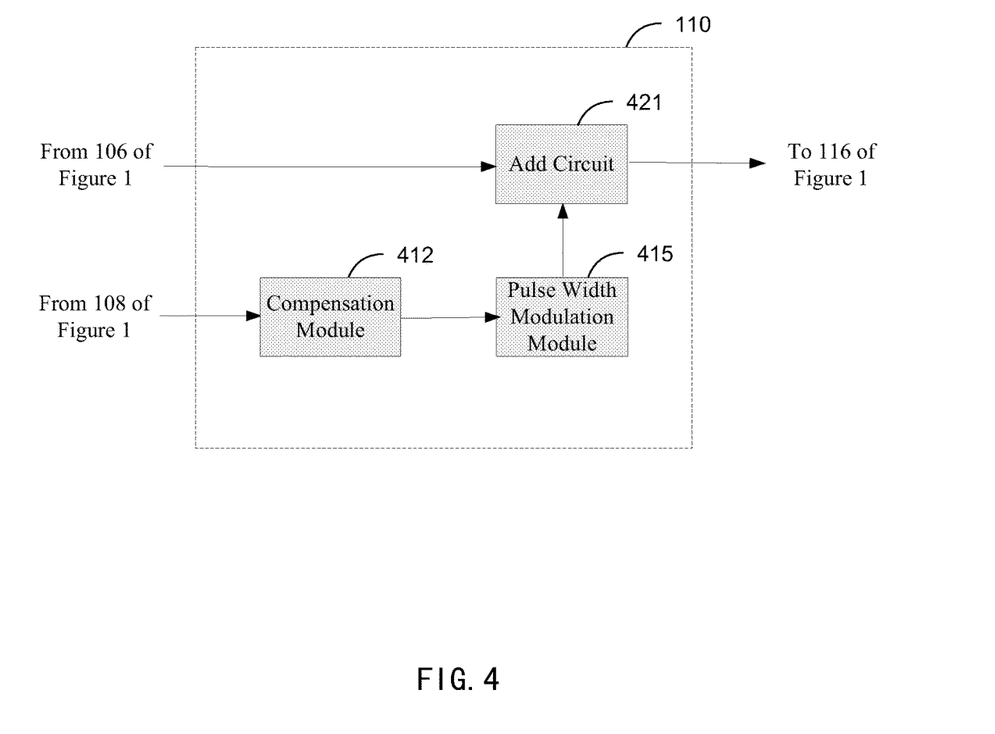
FIG. 4 is a schematic diagram of a signal processing and output circuit of an analog sensor according to an exemplary embodiment of the present disclosure.

FIG. 4 is a schematic diagram of a signal processing and output circuit of an analog sensor according to a further exemplary embodiment of the present disclosure. The signal processing and output circuit 110 includes a compensation module 412 connected to the output of the analog-to-digital conversion module 108 and compensating the first digital signal to generate an amount of analog signal to be compensated, a pulse width modulation module 415 connected to the output of the compensation module 412 and pulse modulating the amount of analog signal to be compensated with a square wave to generate a fourth analog signal, and an add circuit 421 connected to the output of the strain gauge bridge 106 and the output of the pulse width modulation module 415 of the analog sensor, receiving the first analog signal and the fourth analog signal, and adding the first analog signal and the fourth analog signal to generate the second analog signal. The second analog signal is further outputted through an analog output port 116 (See FIG. 1).

Figure 5:
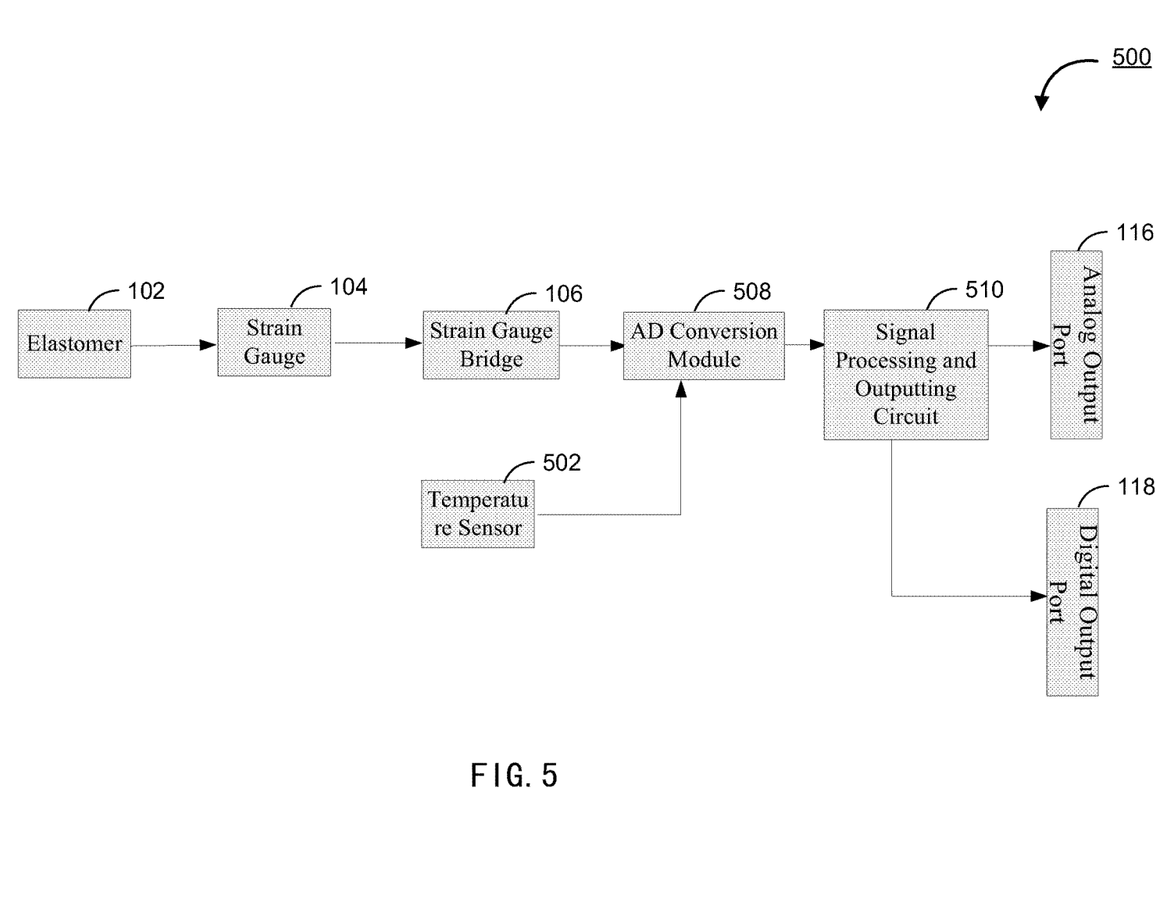
FIG. 5 is a schematic diagram of an analog sensor according to an exemplary embodiment of the present disclosure.

FIG. 5 is a schematic diagram of an analog sensor according to an exemplary embodiment of the present disclosure. The analog sensor 500 shown in FIG. 5 differs from the analog sensor 100 shown in FIG. 1 in that the analog sensor 500 includes a temperature sensor 502, an output of the temperature sensor 502 being connected to an input of the analog-to-digital conversion module 508, the temperature sensor 502 collecting analog signals representative of the temperature and outputting them into an input of the analog-to-digital conversion module 508, where the analog signals representative of the temperature and the first analog signal being converted together into the first digital signal. The signal processing and output circuit 510 may also have various implementations as shown in the embodiments of signal processing and output circuit 110 as shown in FIGS. 2-4. Other components and functions of FIG. 5 are in correspondence with and similar to those of FIG. 1, and thus are not redundantly described herein.

Figure 6:
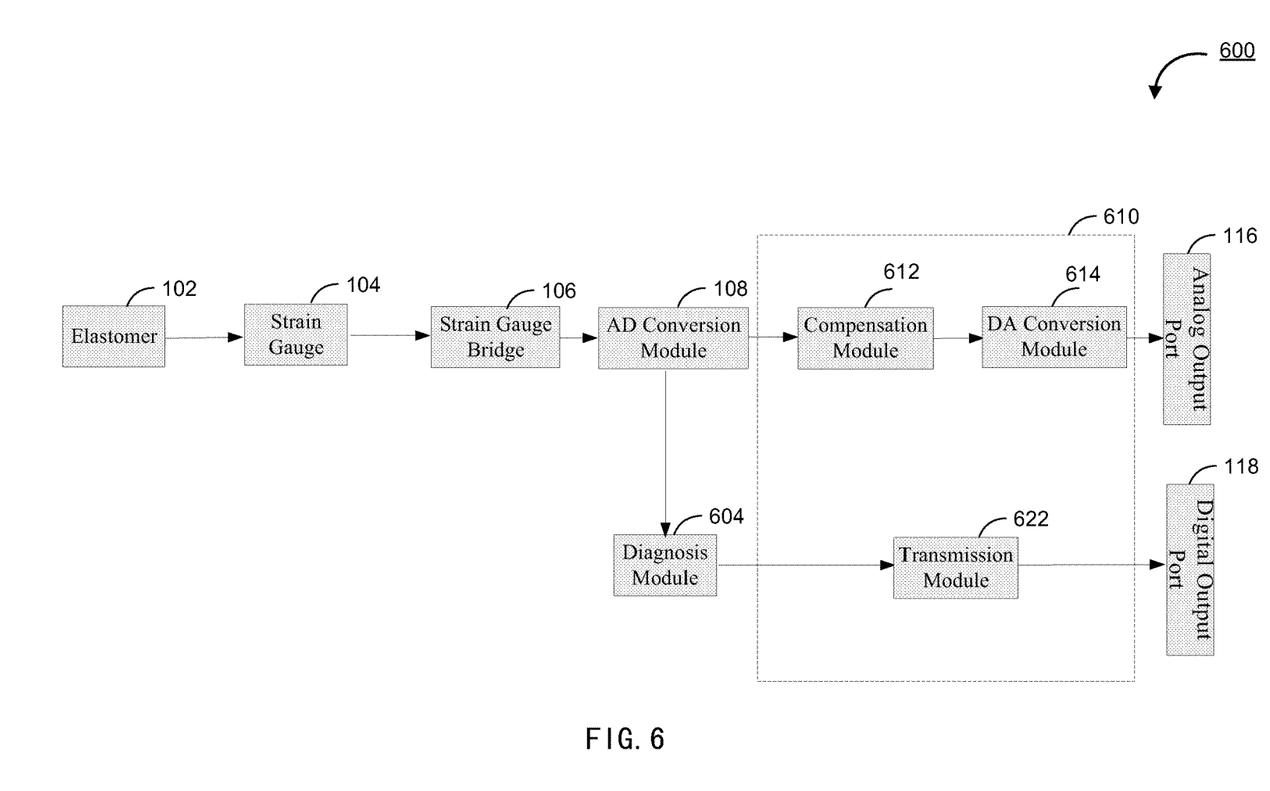
FIG. 6 is a schematic diagram of an analog sensor according to an exemplary embodiment of the present disclosure.

FIG. 6 is a schematic diagram of an analog sensor according to an exemplary embodiment of the present disclosure. The analog sensor 600 shown in FIG. 6 differs from the analog sensor 100 shown in FIG. 1 in that the analog sensor 600 includes a diagnosis module 604, the diagnosis module 604 being connected between an output of the analog-to-digital conversion module 108 and an input of the signal processing and output circuit 610, analyzing the first analog signal to generate diagnosis status data representative of an operational status of the analog sensor, and transferring the diagnosis status data to the signal processing and output circuit 610. The analog sensor 600 shown in FIG. 6 further differs from the analog sensor 100 shown in FIG. 1 that the signal processing and output circuit 610 includes: a compensation module 612 connected to the output of the analog-to-digital conversion module 108 and compensating the first digital signal to generate a compensated first digital signal; a digital-to-analog conversion module 614 connected to an output of the compensation module 612, receiving the compensated first digital signal and converting it into the second analog signal; and a transmission module 622 connected between the output of the diagnosis module 604 and a digital output port 118 and transferring the diagnosis status data. Other components and functions of FIG. 6 are in correspondence with and similar to those of FIG. 1, and thus are not redundantly described herein.

Figure 7:
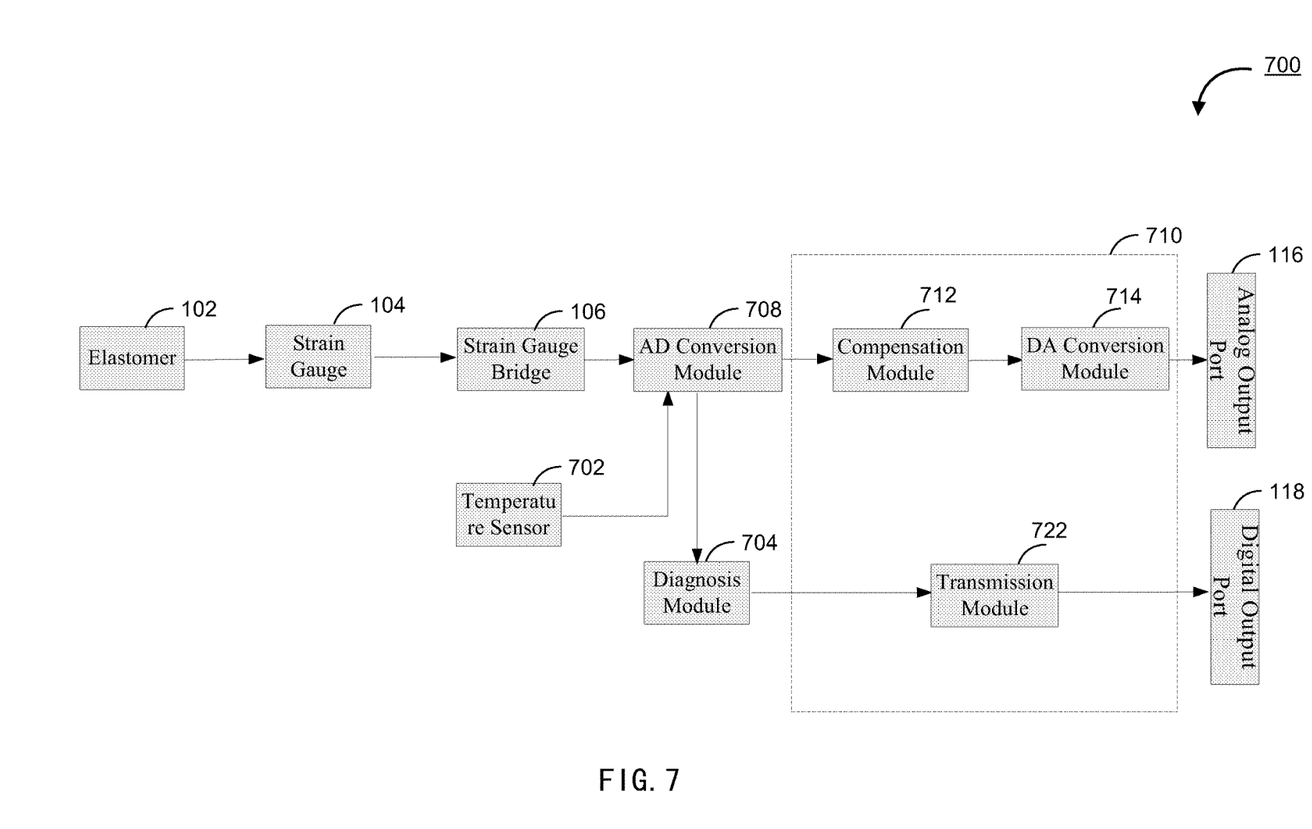
FIG. 7 is a schematic diagram of an analog sensor according to an exemplary embodiment of the present disclosure.

FIG. 7 is a schematic diagram of an analog sensor according to an exemplary embodiment of the present disclosure. The analog sensor 700 shown in FIG. 7 differs from the analog sensor 600 shown in FIG. 6 in that the analog sensor 700 includes: a temperature sensor 702, an output of the temperature sensor 702 being connected to an input of the analog-to-digital conversion module 708, the temperature sensor 702 collecting analog signals representative of the temperature and outputting them into an input of the analog-to-digital conversion module 708, wherein the analog signals representative of the temperature and the first analog signal being converted together into the first digital signal. Other components and functions of FIG. 7 are in correspondence with and similar to those of FIG. 6, and thus are not redundantly described herein.

Figure 8:
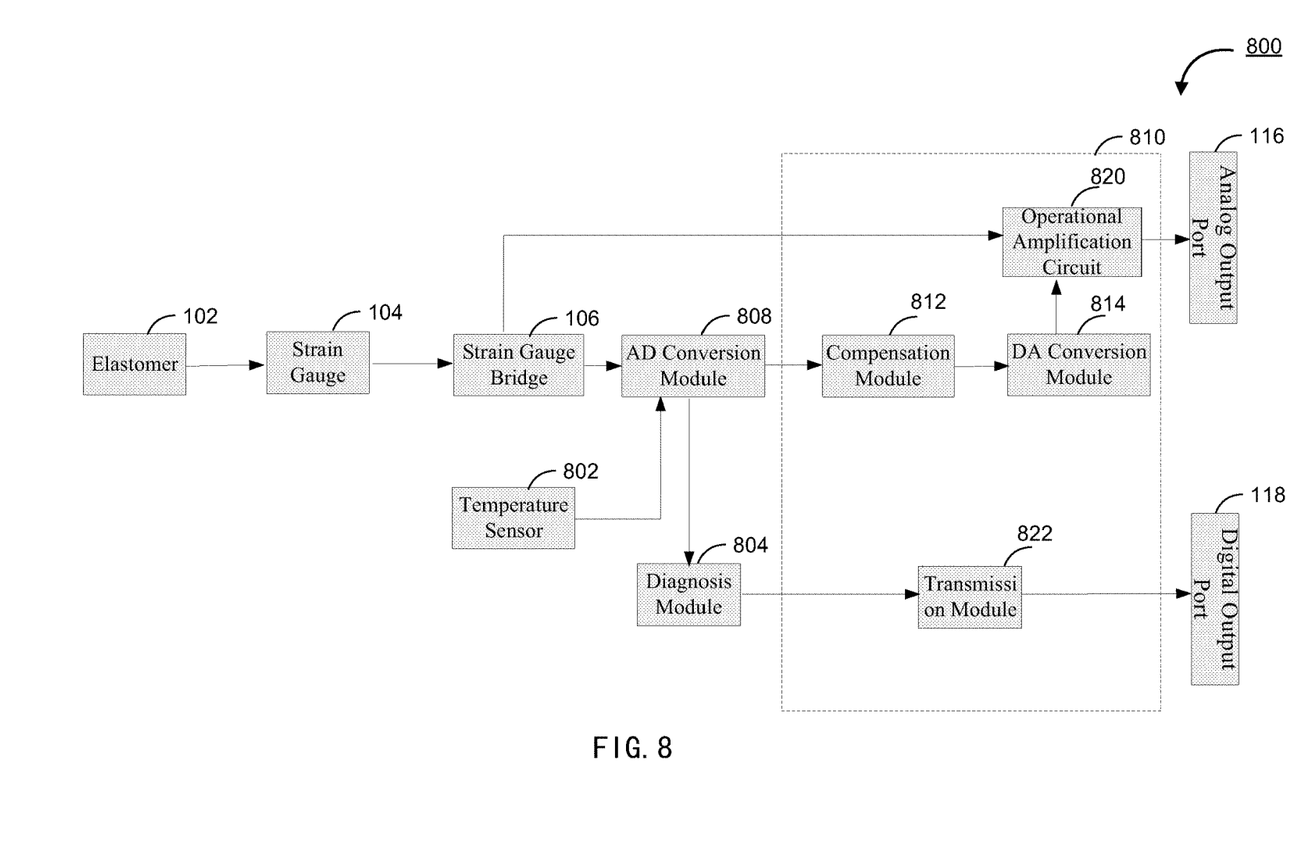
FIG. 8 is a schematic diagram of an analog sensor according to an exemplary embodiment of the present disclosure.

FIG. 8 is a schematic diagram of an analog sensor according to an exemplary embodiment of the present disclosure. The analog sensor 800 shown in FIG. 8 differs from the analog sensor 700 shown in FIG. 7 in that the signal processing and output circuit 810 as shown in FIG. 8 differs from the signal processing and output circuit 710 as shown in FIG. 7. More specifically, the signal processing and output circuit 810 includes: a compensation module 812 connected to the output of the analog-to-digital conversion module 808 and compensating the first digital signal to generate a second digital signal representative of an amount of analog signal to be compensated; a digital-to-analog conversion module 814 connected to an output of the compensation module 812, receiving the second digital signal and converting it into the third analog signal; an operational amplification circuit 820 connected to the output of the strain gauge bridge 106 and the output of the digital-to-analog conversion module 814 of the analog sensor, receiving the first analog signal and the third analog signal and adding the first analog signal and the third analog signal to generate the second analog signal; and a transmission module 822 connected between the output of the diagnosis module 804 and a digital output port 118 and transferring the diagnosis status data. Other components and functions of FIG. 8 are in correspondence with and similar to those of FIG. 7, and thus are not redundantly described herein.

Figure 9:
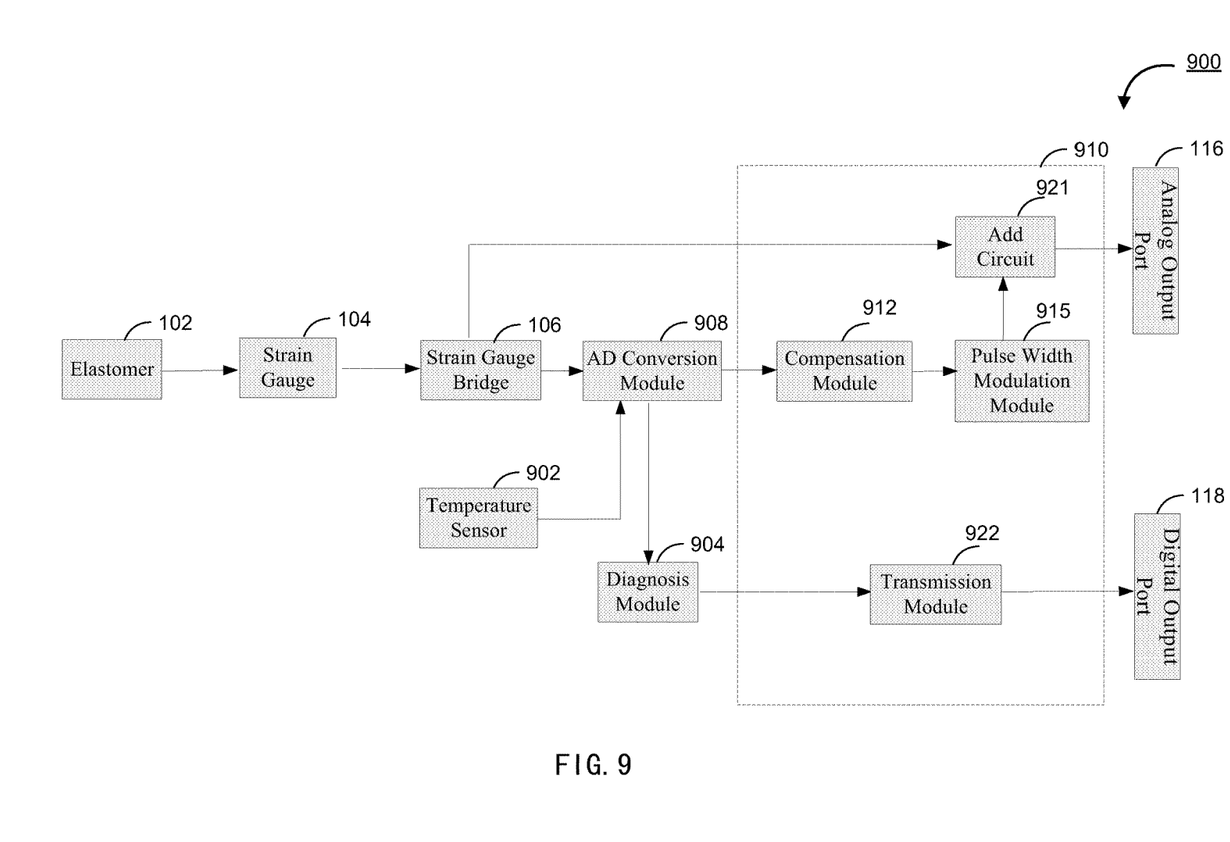
FIG. 9 is a schematic diagram of an analog sensor according to an exemplary embodiment of the present disclosure.

FIG. 9 is a schematic diagram of an analog sensor according to an exemplary embodiment of the present disclosure. The analog sensor 900 shown in FIG. 9 differs from the analog sensor 700 shown in FIG. 7 in that the signal processing and output circuit 910 as shown in FIG. 9 differs from the signal processing and output circuit 710 as shown in FIG. 7. More specifically, the signal processing and output circuit 910 includes: a compensation module 912 connected to the output of the analog-to-digital conversion module 908 and compensating the first digital signal to generate an amount of analog signal to be compensated; a pulse modulation module 915 connected to the output of the compensation module 912 and pulse modulating the amount of analog signal to be compensated with a square wave to generate a fourth analog signal; an add circuit 921 connected to the output of the strain gauge bridge 106 and the output of the pulse width modulation module 915 of the analog sensor, receiving the first analog signal and the fourth analog signal, and adding the first analog signal and the fourth analog signal to generate the second analog signal; and a transmission module 922, the transmission module 922 being connected between the output of the diagnosis module 904 and the digital output port 118 for transferring the diagnosis status data. Other components and functions of FIG. 9 are in correspondence with and similar to those of FIG. 7, and thus are not redundantly described herein.

While the foregoing is directed to embodiments of the present invention, other and further embodiments of the invention may be devised without departing from the basic scope thereof, and the scope thereof is determined by the claims that follow.

It will thus be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SIGNS LIST

| | |
|---|---|
| 100, 500, 600, 700, 800, 900 | Analog sensor |
| 102 | Deformation part |
| 104 | Strain gauge |
| 106 | Strain gauge bridge |
| 108, 508, 708, 808, 908 | analog-to-digital Conversion Module |
| 110, 510, 610, 710, 810, 910 | Signal processing and output circuit |
| 116 | Analog output port |
| 118 | Digital output port |
| 212, 312, 412, 612, 712, 812, 912 | Compensation module |
| 214, 314, 614, 714, 814 | digital-to-analog Conversion Module |
| 415, 915 | Pulse width modulation module |
| 502, 702, 802, 902 | Temperature sensor |
| 604, 704, 804, 904 | Diagnosis Module |
| 320, 820 | Operational amplification circuit |
| 421, 921 | Additional circuit |
| 622, 722, 822, 922 | Transmission module |

The invention claimed is:

1. An analog sensor, comprising:
a deformation part for generating a deformation relating to a force applied to the analog sensor;
at least one strain gauge connected to the deformation part for generating a change in electrical resistance relating to the deformation;
at least one strain gauge bridge in connection with the at least one strain gauge for transferring a change in the electrical resistance of the at least one strain gauge to output a first analog signal;
an analog-to-digital conversion module connected to an output of the at least one strain gauge bridge, receiving the first analog signal from the at least one strain gauge bridge and converting the first analog signal to a first digital signal, where the first analog signal is an analog signal representative of the force;
an analog output port for outputting a second analog signal;
a signal processing and output circuit, the signal processing and output circuit being connected between an output of the analog-to-digital conversion module and the analog output port, for compensating the first digital signal and converting the first digital signal into the second analog signal; and
a diagnosis module, the diagnosis module being connected between an output of the analog-to-digital conversion module and an input of the signal processing and output circuit, for analysing the first analog signal to generate diagnosis status data representative of an operational status of the analog sensor, and for transferring the diagnosis status data to the signal processing and output circuit.

2. The analog sensor according to claim 1, the signal processing and output circuit comprising:
a compensation module connected to the output of the analog-to-digital conversion module for compensating the first digital signal to generate a compensated first digital signal; and
a digital-to-analog conversion module connected to an output of the compensation module, for receiving the compensated first digital signal and converting the compensated first digital signal into the second analog signal.

3. An analog sensor, comprising:
a deformation part for generating a deformation relating to a force applied to the analog sensor;
at least one strain gauge connected to the deformation part for generating a change in electrical resistance relating to the deformation;
at least one strain gauge bridge in connection with the at least one strain gauge for transferring a change in the electrical resistance of the at least one strain gauge to output a first analog signal;
an analog-to-digital conversion module connected to an output of the at least one strain gauge bridge, receiving the first analog signal from the at least one strain gauge bridge and converting the first analog signal to a first digital signal, where the first analog signal is an analog signal representative of the force;
an analog output port for outputting a second analog signal; and
a signal processing and output circuit, the signal processing and output circuit being connected between an output of the analog-to-digital conversion module and the analog output port, for compensating the first digital signal and converting the first digital signal into the second analog signal,
the signal processing and output circuit comprising:
a compensation module connected to the output of the analog-to-digital conversion module for compensating the first digital signal to generate a second digital signal representative of an amount of analog signal to be compensated;

a digital-to-analog conversion module connected to an output of the compensation module, for receiving the second digital signal and converting it into a third analog signal; and an operational amplification circuit connected to an output of the strain gauge bridge and an output of the digital-to-analog conversion module of the analog sensor, for receiving the first analog signal and the third analog signal, and adding the first analog signal and the third analog signal to generate the second analog signal.

4. An analog sensor, comprising:

a deformation part for generating a deformation relating to a force applied to the analog sensor;

at least one strain gauge connected to the deformation part for generating a change in electrical resistance relating to the deformation;

at least one strain gauge bridge in connection with the at least one strain gauge for transferring a change in the electrical resistance of the at least one strain gauge to output a first analog signal;

an analog-to-digital conversion module connected to an output of the at least one strain gauge bridge, receiving the first analog signal from the at least one strain gauge bridge and converting the first analog signal to a first digital signal, where the first analog signal is an analog signal representative of the force;

an analog output port for outputting a second analog signal; and a signal processing and output circuit, the signal processing and output circuit being connected between an output of the analog-to-digital conversion module and the analog output port, for compensating the first digital signal and converting the first digital signal into the second analog signal, the signal processing and output circuit comprising:

a compensation module connected to the output of the analog-to-digital conversion module for compensating the first digital signal to generate an amount of analog signal to be compensated;

a pulse width modulation module connected to the output of the compensation module for pulse modulating an amount of analog signal to be compensated with a square wave to generate a fourth analog signal; and an add circuit connected to an output of the strain gauge bridge and an output of the pulse width modulation module of the analog sensor, for receiving the first analog signal and the fourth analog signal, and adding the first analog signal and the fourth analog signal to generate the second analog signal.

5. The analog sensor according to claim 1, the analog sensor comprising:

a temperature sensor, an output of the temperature sensor being connected to an input of the analog-to-digital conversion module, the temperature sensor being arranged for collecting analog signals representative of temperature and outputting them into an input of the analog-to-digital conversion module;

wherein the analog signals representative of the temperature and the first analog signal will be converted together into the first digital signal.

6. The analog sensor according to claim 3, the analog sensor comprising:

a digital output port, and the signal processing and output circuit having a transmission module, the transmission module being connected between an output of the diagnosis module and the digital output port for transferring the diagnosis status data.

7. The analog sensor according to claim 4, the analog sensor comprising:

a digital output port, the signal processing and output circuit having a transmission module, the transmission module being connected between an output of the diagnosis module and the digital output port for transferring the diagnosis status data.

8. The analog sensor according to claim 1, wherein the analog sensor is an analog weighing sensor comprising:

a deformation part for generating a deformation relating to a load sensed by the analog sensor;

at least one strain gauge connected to the deformation part for generating a change to the electrical resistance according to the deformation;

at least one strain gauge bridge in connection with the at least one strain gauge for transferring the change to the electrical resistance to output a first analog signal;

an analog-to-digital conversion module connected to an output of the at least one strain gauge bridge, for receiving the first analog signal from the at least one strain gauge bridge and converting the first analog signal to a first digital signal, where the first analog signal is an analog signal representative of the load;

a signal processing and output circuit the signal processing and output circuit being connected between the output of the analog-to-digital conversion module and the analog output port, for compensating the first digital signal and converting the first digital signal into a second analog signal; and an analog output port for outputting the second analog signal.

9. The analog sensor according to claim 2, the analog sensor comprising:

a temperature sensor, an output of the temperature sensor being connected to an input of the analog-to-digital conversion module, the temperature sensor being arranged for collecting analog signals representative of temperature and outputting them into an input of the analog-to-digital conversion module;

wherein the analog signals representative of the temperature and the first analog signal will be converted together into the first digital signal.

10. The analog sensor according to claim 3, the analog sensor comprising:

a temperature sensor, an output of the temperature sensor being connected to an input of the analog-to-digital conversion module, the temperature sensor being arranged for collecting analog signals representative of temperature and outputting them into an input of the analog-to-digital conversion module;

wherein the analog signals representative of the temperature and the first analog signal will be converted together into the first digital signal.

11. The analog sensor according to claim 4, the analog sensor comprising:

a temperature sensor, an output of the temperature sensor being connected to an input of the analog-to-digital conversion module, the temperature sensor being arranged for collecting analog signals representative of temperature and outputting them into an input of the analog-to-digital conversion module;

wherein the analog signals representative of the temperature and the first analog signal will be converted together into the first digital signal.

12. The analog sensor according to claim 3, the analog sensor comprising:
a diagnosis module, the diagnosis module being connected between an output of the analog-to-digital conversion module and an input of the signal processing and output circuit, for analysing the first analog signal to generate diagnosis status data representative of an operational status of the analog sensor, and for transferring the diagnosis status data to the signal processing and output circuit.

13. The analog sensor according to claim 4, the analog sensor comprising:
a diagnosis module, the diagnosis module being connected between an output of the analog-to-digital conversion module and an input of the signal processing and output circuit, for analysing the first analog signal to generate diagnosis status data representative of an operational status of the analog sensor, and for transferring the diagnosis status data to the signal processing and output circuit.

14. The analog sensor according to claim 3, the analog sensor comprising:
a temperature sensor, an output of the temperature sensor being connected to an input of the analog-to-digital conversion module, the temperature sensor being arranged for collecting analog signals representative of temperature and outputting them into an input of the analog-to-digital conversion module, wherein the analog signals representative of the temperature and the first analog signal will be converted together into the first digital signal; and
a diagnosis module, the diagnosis module being connected between an output of the analog-to-digital conversion module and an input of the signal processing and output circuit, for analysing the first analog signal to generate diagnosis status data representative of an operational status of the analog sensor, and for transferring the diagnosis status data to the signal processing and output circuit.

15. The analog sensor according to claim 4, the analog sensor comprising:
a temperature sensor, an output of the temperature sensor being connected to an input of the analog-to-digital conversion module, the temperature sensor being arranged for collecting analog signals representative of temperature and outputting them into an input of the analog-to-digital conversion module, wherein the analog signals representative of the temperature and the first analog signal will be converted together into the first digital signal; and
a diagnosis module, the diagnosis module being connected between an output of the analog-to-digital conversion module and an input of the signal processing and output circuit, for analysing the first analog signal to generate diagnosis status data representative of an operational status of the analog sensor, and for transferring the diagnosis status data to the signal processing and output circuit.

16. The analog sensor according to claim 7, wherein the analog sensor is an analog weighing sensor comprising:
a deformation part for generating a deformation relating to a load sensed by the analog sensor;
at least one strain gauge connected to the deformation part for generating a change to the electrical resistance according to the deformation;
at least one strain gauge bridge in connection with the at least one strain gauge for transferring the change to the electrical resistance to output a first analog signal;
an analog-to-digital conversion module connected to an output of the at least one strain gauge bridge, for receiving the first analog signal from the at least one strain gauge bridge and converting the first analog signal to a first digital signal, where the first analog signal is an analog signal representative of the load;
a signal processing and output circuit the signal processing and output circuit being connected between the output of the analog-to-digital conversion module and the analog output port, for compensating the first digital signal and converting the first digital signal into a second analog signal; and
an analog output port for outputting the second analog signal.

* * * * *

UNITED STATES PATENT AND TRADEMARK OFFICE
CERTIFICATE OF CORRECTION

PATENT NO. : 10,215,617 B2
APPLICATION NO. : 15/134087
DATED : February 26, 2019
INVENTOR(S) : Feng Dai et al.

Page 1 of 1

It is certified that error appears in the above-identified patent and that said Letters Patent is hereby corrected as shown below:

On the Title Page

(73) Assignees:
"METTER TOLEDO (CHANGZHOU) PRECISION INSTRUMENT LTD., Changzhou, Jiangsu (CN); METTER TOLEDO (CHANGZHOU) MEASUREMENT TECHNOLOGY LTD., Changzhou, Jiangsu (CN); METTER TOLEDO (CHANGZHOU) SCALE & SYSTEM LTD., Changzhou, Jiangsu (CN)"

Should read:
--METTLER-TOLEDO (CHANGZHOU) PRECISION INSTRUMENT LTD., Changzhou, Jiangsu (CN); METTLER-TOLEDO (CHANGZHOU) MEASUREMENT TECHNOLOGY LTD., Changzhou, Jiangsu (CN); METTLER-TOLEDO (CHANGZHOU) SCALE & SYSTEM LTD., Changzhou, Jiangsu (CN)--

In the Claims

In Column 12, Line 17, "...according to claim 7, wherein..." should read --...according to claim 9, wherein...--

Signed and Sealed this
Sixteenth Day of July, 2019

Andrei Iancu
*Director of the United States Patent and Trademark Office*